United States Patent [19]
Loibl

[11] Patent Number: 5,588,123
[45] Date of Patent: Dec. 24, 1996

[54] BUS SYSTEM

[75] Inventor: Josef Loibl, Regen, Germany

[73] Assignee: Siemens Aktiengesellschaft, Munich, Germany

[21] Appl. No.: 249,540

[22] Filed: May 26, 1994

Related U.S. Application Data

[63] Continuation of PCT/EP92/02676, published as WO93/11002, Jun. 10, 1923.

[30] Foreign Application Priority Data

Nov. 26, 1991 [EP] European Pat. Off. ............. 91120166

[51] Int. Cl.$^6$ .................................................. G06F 15/00
[52] U.S. Cl. ...................... 395/287; 395/290; 364/424.04
[58] Field of Search .................................... 395/325, 200, 395/287, 289, 290, 306; 364/424.01, 424.03, 424.1, 431.04

[56] References Cited

U.S. PATENT DOCUMENTS

| | | | |
|---|---|---|---|
| 4,001,790 | 1/1977 | Barlow | 395/325 |
| 4,718,060 | 1/1988 | Oguchi et al. | 370/85 |
| 4,825,362 | 4/1989 | Minami et al. | 395/200 |
| 4,853,850 | 8/1989 | Krass, Jr. et al. | 364/424.1 |
| 4,873,451 | 10/1989 | Pristera et al. | 307/10.1 |
| 5,001,642 | 3/1991 | Botzenhardt et al. | 364/431.12 |
| 5,278,759 | 1/1994 | Berra et al. | 364/424.01 |
| 5,321,689 | 6/1994 | Suzuki et al. | 370/16 |
| 5,339,782 | 8/1994 | Gölzer | 123/399 |
| 5,343,470 | 8/1994 | Hideshima et al. | 370/85.1 |
| 5,345,384 | 9/1994 | Przybyla et al. | 364/424.04 |
| 5,353,009 | 10/1994 | Marsh et al. | 340/505 |
| 5,402,394 | 3/1995 | Turski | 368/10 |
| 5,444,626 | 8/1995 | Schenk | 364/431.04 |
| 5,444,643 | 8/1995 | Häussler et al. | 364/579 |
| 5,448,180 | 9/1995 | Kienzler et al. | 326/15 |

FOREIGN PATENT DOCUMENTS 9117069  11/1991  WIPO ............................ B60R 16/02

OTHER PUBLICATIONS

Article: Conference Proceedings C205/85, I. Mech. E. 1985, pp. 227–230 (Veldhuizen) "Proposal for an automotive multiplex wiring system".

*Primary Examiner*—Ayaz R. Sheikh
*Attorney, Agent, or Firm*—Herbert L. Lerner; Laurence A. Greenberg

[57] ABSTRACT

A bus system includes a plurality of control devices in a motor vehicle, being interconnected by means of a vehicle bus. The data transmitted on the bus are read out by a data module which generates items of information from them that are non-urgent, for example items of statistical information. The items of information are output through the bus as message blocks with a low transmission repetition frequency. They can then be extracted from the individual control devices as required and evaluated. In addition, data which are supplied by various sensors in the motor vehicle are evaluated in the data module.

11 Claims, 3 Drawing Sheets

FIG. 4

| DEVICES/DATA | IDENTIFIER | DEVICE 1 | DEVICE 2 | DEVICE 3 | TRANSMISSION REPETITION TIME |
|---|---|---|---|---|---|
| OBJECT 1 DEVICE 1 <br> - DATE 11 <br> - DATE 12 <br> . <br> . <br> - DATE 1n | ID1 | s <br> s <br> <br> <br> s | <br> e <br> <br> <br> | e <br> e <br> <br> <br> e | 20 ms |
| OBJECT 2 DEVICE 2 <br> - DATE 21 <br> - DATE 22 <br> . <br> . <br> - DATE 2n | ID2 | e <br> <br> <br> <br> e | s <br> s <br> <br> <br> s | e <br> e <br> <br> <br> e | 10 ms |
| OBJECT 3 DEVICE 3 <br> -TRANSMISSION CYCLE COUNTER <br> -INFO BYTE 1 <br> -INFO BYTE 2 | ID3 | e <br> e <br> e | e <br> e <br> e | s <br> s <br> s | 100 ms |

12# BUS SYSTEM

CROSS-REFERENCE TO RELATED APPLICATION

This application is a Continuation of International application Ser. No. PCT/EP92/02676, filed Nov. 20, 1992.

BACKGROUND OF THE INVENTION

Field of the Invention

The invention relates to a bus system, in particular in a motor vehicle, which includes a plurality of interconnected control devices, and in which data transmitted on the bus are evaluated in a central device.

Such a bus system interconnects a plurality of control devices which have to interchange data. In the case of use in a motor vehicle, such control devices are, for example, the controller for an antilock braking system and a traction control system, the engine control, the electronic transmission control, the airbag control and the like.

A bus system which replaces the evermore extensive individual wiring cable harnesses in motor vehicles is known from an article in the Conference Proceedings C205/85, I. Mech. E. 1985, pages 227–230, entitled: Proposal for an Automotive Multiplex Wiring System). In that device, a serial bus interconnects independent control devices (engine management, dashboard computer) and modules which are controlled by a central control. The latter controls all of the information inputs and outputs and additionally carries out special tasks (time output, data storage, signalling). The modules which are distributed over the motor vehicle are an interface between signal inputs (switches, sensors) and signal outputs (driver circuits for lamps, motors and actuators) on one hand and the bus on the other hand. The data transmission is always performed through the central computer.

If one of the control devices requires data which are evaluated over relatively long periods, for example statistically prepared data, it must compute them itself in each case by using individually stored algorithms. That produces a large program requirement in the individual control device, and as a result it frequently happens that statistical functions and processes, for example adaptation processes, cannot be carried out although they would be useful.

SUMMARY OF THE INVENTION

It is accordingly an object of the invention to provide a bus system, which overcomes the hereinafore-mentioned disadvantages of the heretofore-known devices of this general type and which processes all of the signals available on the bus, additional important measurement signals and time data, and stores them, if required, for long-term evaluation.

With the foregoing and other objects in view there is provided, in accordance with the invention, a bus system, in particular in a motor vehicle, comprising a plurality of control devices; a bus interconnecting the control devices; and a central device for evaluating data transmitted on the bus; the central device being constructed as a data module for reading out data transmitted on the bus and for generating non-urgent items of information from the data; the items of information being output through the bus as messages with a low transmission repetition frequency; and the items of information being extracted from the bus as individually required by the control devices.

In accordance with another feature of the invention, there are provided sensors in the motor vehicle supplying data being evaluated in the data module.

In accordance with a further feature of the invention, there is provided an optical or acoustic display unit outputting display data being generated in the data module.

In accordance with an added feature of the invention, the messages include a first byte or word representing a transmission cycle counter, and one to four further bytes containing information to be provided.

In accordance with an additional feature of the invention, the data module is a component of a vehicle computer.

In accordance with a concomitant feature of the invention, all of the information generated by the data module is output through the bus in each case within a time interval of 30 seconds.

The advantages of the invention reside, in particular, in the fact that the data module of the bus system uses freely prescribable processes and methods, for example including methods of fuzzy logic, to generate statistical data, to output them cyclically through the bus as multiplexed data words, and thus to make them available to all of the connected devices, which are the so-called stations.

Other features which are considered as characteristic for the invention are set forth in the appended claims.

Although the invention is illustrated and described herein as embodied in a bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagrammatic representation of a so-called communication matrix for a prescribed bus system.

DESCRIPTION OF THE PREFERRED EMBODIMENTS

Figure 1:
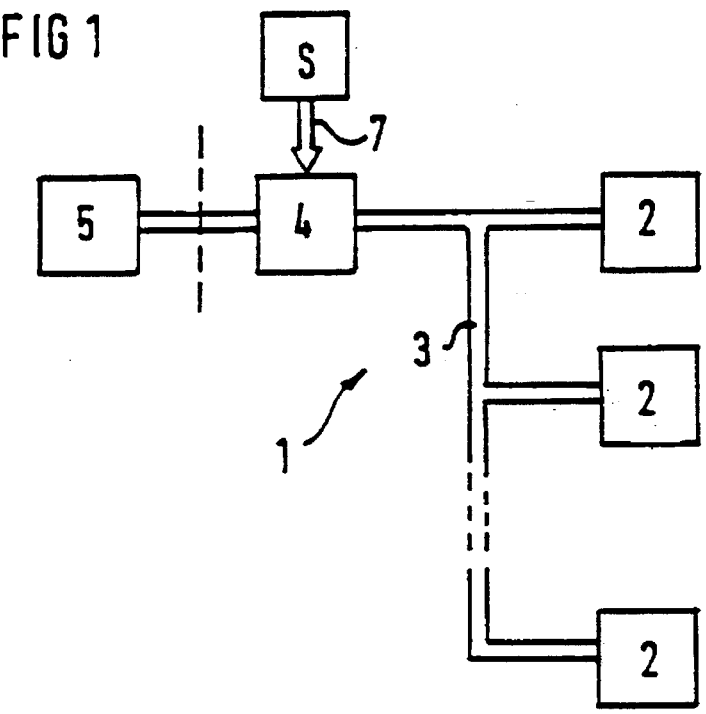
FIG. 1 is a block circuit diagram of a bus system according to the invention.

Referring now to the figures of the drawing in detail and first, particularly, to FIG. 1 thereof, there is seen a bus system 1 which includes a plurality of control devices 2 that are connected with one another through a serial bus 3.

Known examples of such a bus are the so-called vehicle bus, the VAN bus and the CAN bus. Also connected to the bus 3 is a data module 4 which acquires all of the data present on the bus as well as additional important measured values that are supplied to it by various sensors S in the motor vehicle through data lines 7. Data are determined in a statistically prepared fashion from these data and measured values in the data module 4, specifically taking account of the date and the time of day. Statistical preparation of data is understood in this case as the acquisition of data and measured values over a prescribable period and preparation of derived values, for example mean values, from these data.

As mentioned, the statistical data can be determined by using a fuzzy logic process, for example. They are useful for the control devices and they can be used in them for adaptation and optimization processes. However, they are non-urgent, specifically in contrast with the measurement signals for the individual control devices and for the control signals which are output by the latter and need to be processed in real time.

Figure 3:
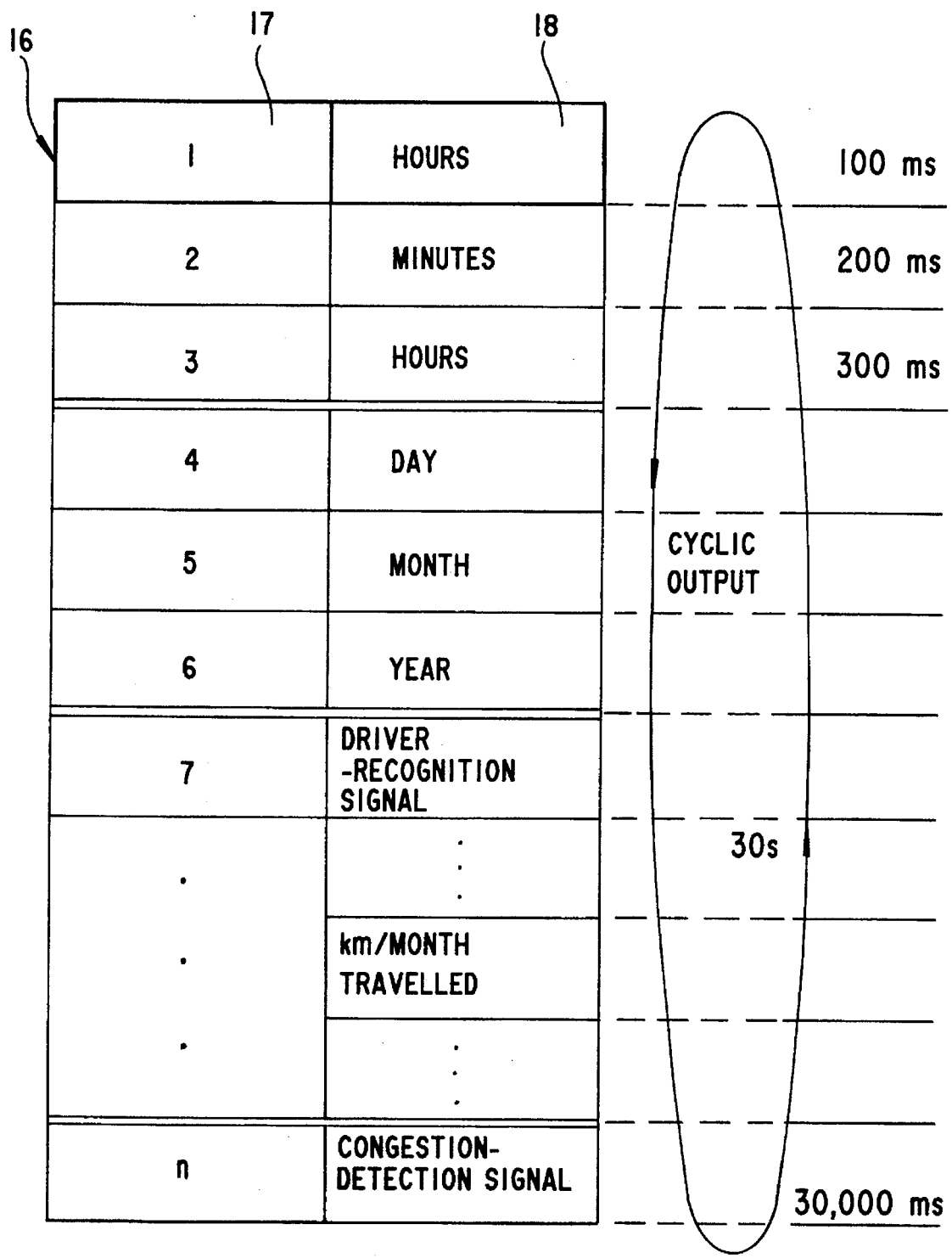
FIG. 3 is a diagrammatic representation of a possible structure of data provided on the bus.

The statistical data are output cyclically on the bus 3 by the data module 4 as a multiplexed message, that is to say in the form of a time-division multiplex signal, and thus made available to all of the control devices 2 (in addition compare the description of FIGS. 3 and 4).

It is also possible to connect a display device 5 to the bus system 1. The display device 5 may, for example, be in the form of an optical display or a warning gong, through which display signals that are determined by the data module 4 from the evaluated data, are output.

Figure 2:
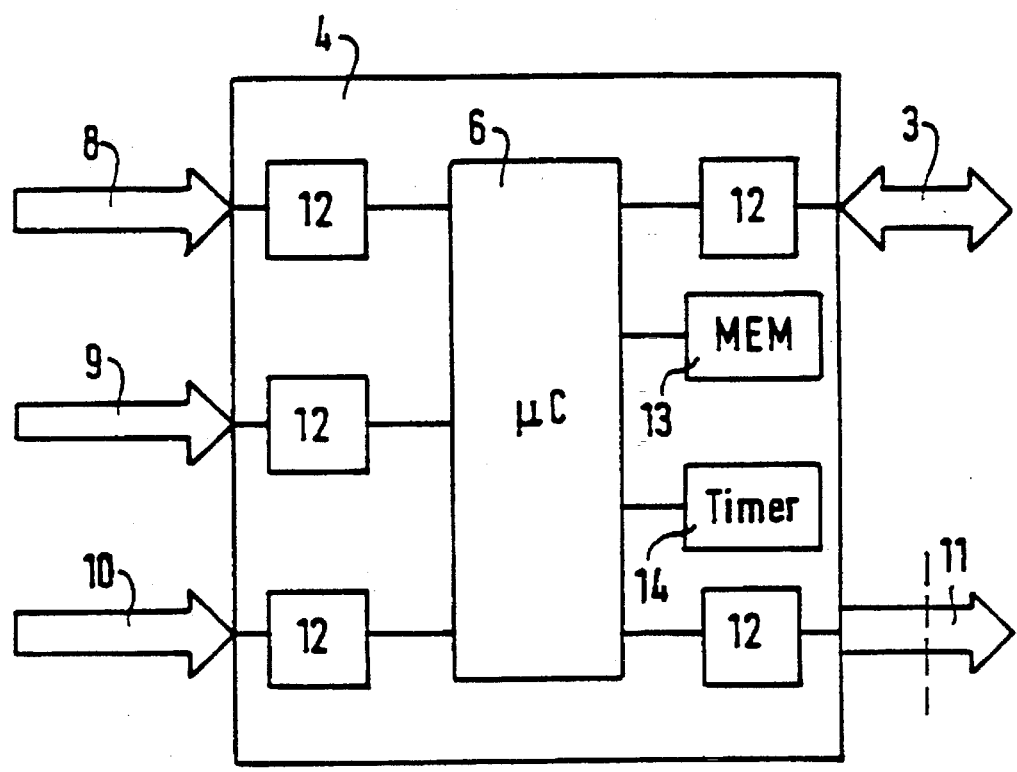
FIG. 2 is a block circuit diagram of a data module of the bus system according to FIG. 1.

The data module 4 shown in FIG. 2 contains an arithmetic unit 6, such as a microcomputer or microcontroller, to which a plurality of input and output lines are connected. Digital input signals, analog input signals and frequency signals, for example from tachometer generators, pass into the data module 4 through lines 8, 9 and 10. All of the data transmitted on the bus 3 pass from the bus 3 as input signals to the data module 4. The statistical useful data determined in the data module are output through the bus as multiplexed output signals. If required, a line 11, which can be constructed as a multiple line or bus, leads to the display unit 5.

In each case the bus 3 and the lines 8 to 11 are connected to the arithmetic unit 6 through an adaptor or interface circuit 12. Level conversions, analog/digital conversions and the like are carried out in a known manner in these adaptor circuits, which are all designated by reference numeral 12 for the sake of simplicity. As a rule, they contain a driver circuit in the case of the output lines.

The data module 4 can be constructed as an independent control device, it can be integrated into a vehicle computer and it can also be contained in another, arbitrary control device in the form of stored algorithms. The power supply is provided through non-illustrated terminals Kl.15 or Kl.30 of the vehicle network. In addition, a memory module 13, for example an EEPROM, and a timer module 14, are connected to the arithmetic unit or microcontroller 6.

In addition to the already-mentioned determination of statistical data, it is also possible to determine data in the data module which in the case of known bus systems are determined in individual control devices such as, for example, a reference speed for an antilock braking system controller or a traction control system controller.

Possible output data on the data module 4 are the following: the time of day, the date, the season (numbered from 1 to 4), the outside temperature, the altitude-dependent atmospheric pressure, a rain-detection or snow-detection signal, a road condition signal, a driver-recognition signal, a signal characteristic of a driving style of the driver (sport, economic, restrained), the driving and stationary times in percentages, the driving cycles, that is to say the percentage driving components on the highways, country roads and in town, a congestion-detection signal, data regarding the kilometer/month travelled, specifically for the current and for the preceding months, the measured maximum speed, the average speed, the average consumption, and the number of starts/month, etc.

The provision of the data on a bus system is explained as follows with the aid of an example of a conventional vehicle bus in FIG. 3. Messages or message blocks, which in each case include from two to six bytes, are output cyclically on the bus 3 by the data module 4. A first byte or word (=two bytes) 17 contains a transmission cycle counter which enumerates transmitted data words from one up to a maximum number of n. A second byte or word 18 and a third non-illustrated byte or word contain the information to be output, that is to say general or statistical data prepared by the data module. As examples of such data, FIG. 3 indicates the already mentioned data regarding time of day and date, a driver-recognition signal, kilometers travelled per month, and a congestion-detection signal. The messages including from two to six bytes are also designated as useful object data.

The data transmission speed in a CAN bus is 125 kBauds, for example. Since it is a question of data which are non-urgent with respect to the transmission time, a transmission repetition time of 100 ms is satisfactory. If the complete data set is transmitted every 30 seconds, a maximum of 300 useful information items can be transmitted, since 30×1000 ms/100 ms=300.

A so-called communication matrix shown in FIG. 4 is used to make a determination for the bus as to which of the devices connected to the bus transmits or receives which data. The communication matrix is represented in this case as an example of three devices, wherein the device 3 transmits the statistical data, that is to say it is the data module.

A device forms a so-called object together with the respectively transmitted data, with the device 1 thus forming an object 1 with the data 1.1 to 1.n, etc.. Each device is assigned an identifying feature, which is a so-called identifier: the device 1 is assigned an identifier ID1, the device 2 an identifier 2, and the device 3 (data module 4) an identifier ID3, etc..

The transmitted data are represented in the communication matrix by a small s, and the received data by a small e.

It is therefore possible to make a maximum number n of non-urgent data available to all stations in a minimum number of memory locations of the bus 3.

The transmission of input signals on the bus 3, and the exchange of communication signals between the control devices 3 (such as the engine management or the valve control) is not carried out in the way described herein. Such signals are transmitted through the bus according to known processes at a relatively high transmission speed. They require a substantially higher transmission capacity. On the other hand, they do not entirely exhaust the transmission capacity, with the result being that the non-urgent data can be transmitted on the side, as it were. However, it is possible in accordance with the previously described process to output optical or acoustic monitoring and display data.

I claim:

1. A bus system, comprising:

a plurality of control devices;

a bus interconnecting said control devices, said control devices exchanging data via said bus;

a central device;

said central device reading out data transmitted on said bus, evaluating the data and generating items of information from the data;

said central device outputting the items of information through said bus as messages with a low transmission repetition frequency; and said control devices extracting the items of information from said bus as individually required.

2. The bus system according to claim 1, including sensors connected to said central device and supplying data to be evaluated in said central device.

3. The bus system according to claim 1, including an optical or acoustic display unit connected to said central device and outputting display data generated in said central device.

4. The bus system according to claim 1, wherein the messages include a first byte or word representing a transmission cycle counter, and one to four further bytes containing information to be provided.

5. The bus system according to claim 1, wherein all of the information generated by said central device is output through said bus in each case within a time interval of 30 seconds.

6. A bus system in a motor vehicle, comprising:

a plurality of control devices;

a bus interconnecting said control devices, said control devices exchanging data via said bus;

a central device;

said central device reading out data transmitted on said bus, evaluating the data and generating items of information from the data;

said central device outputting the items of information through said bus as messages with a low transmission repetition frequency; and said control devices extracting the items of information from said bus as individually required.

7. The bus system according to claim 6, including sensors connected to said central device in the motor vehicle and supplying data to be evaluated in said central device.

8. The bus system according to claim 6, including an optical or acoustic display unit connected to said central device and outputting display data generated in said central device.

9. The bus system according to claim 6, wherein the messages include a first byte or word representing a transmission cycle counter, and one to four further bytes containing information to be provided.

10. The bus system according to claim 6, wherein said data module is a component of a vehicle computer.

11. The bus system according to claim 6, wherein all of the information generated by said data module is output through said bus in each case within a time interval of 30 seconds.

* * * * *